UNITED STATES PATENT OFFICE.

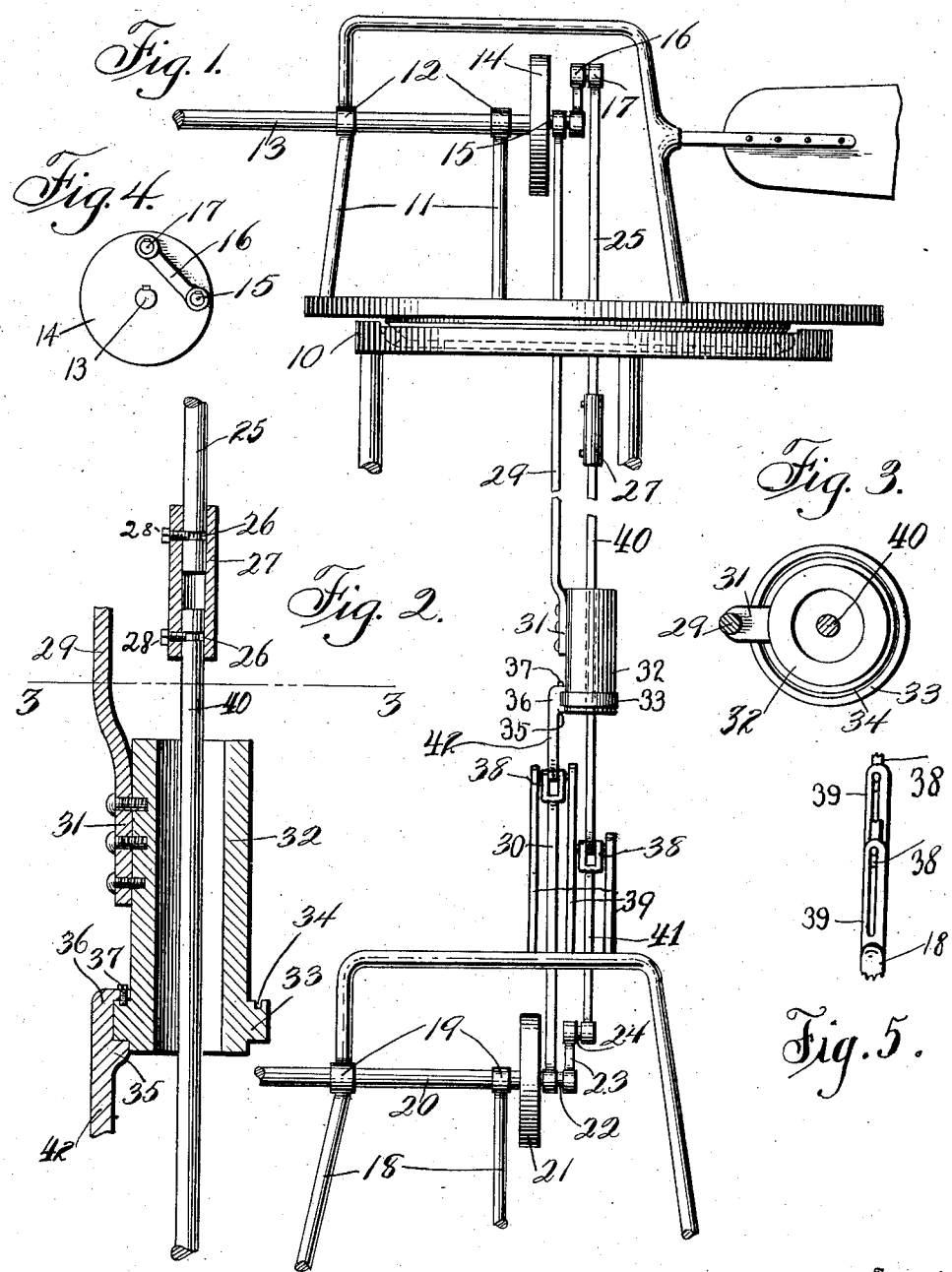

PAUL HABECK, OF RANKIN, OKLAHOMA.

MECHANICAL MOVEMENT.

1,016,743.     Specification of Letters Patent.     Patented Feb. 6, 1912.

Application filed November 3, 1908. Serial No. 460,849.

*To all whom it may concern:*

Be it known that I, PAUL HABECK, a citizen of the United States, residing at Rankin, in the county of Roger Mills, State of Oklahoma, have invented certain new and useful Improvements in Mechanical Movements; and I do hereby declare the following to be a full, clear, and exact description of the invention, such as will enable others skilled in the art to which it appertains to make and use the same.

This invention relates to mechanical movements and has special reference to a connection between a windmill shaft or other shaft arranged to swing around the central point and a second shaft held in fixed bearings, the connection being such as to prevent dead centers.

One object of the invention is to provide a novel means whereby a pair of connecting rods may operate on a double crank at one end and be operated by a double crank at the other end, which double crank swings around a center at right angles to its center of rotation.

With the above and other objects in view, the invention consists, in general, of a pair of rotatable disks each carrying a double crank and a novel form of connecting rods connecting said cranks.

The invention further consists in certain novel arrangements of details and combinations of parts hereinafter fully described, illustrated in the accompanying drawings, and specifically set forth in the claim.

In the accompanying drawings, like characters of reference indicate like parts in the several views, and:—Figure 1 is a broken side elevation of a windmill equipped with this invention. Fig. 2 is a detail of the improved swivel connection between the joints of the connecting rods, the view being taken in section. Fig. 3 is a horizontal sectional view on the line 3—3 of Fig. 2. Fig. 4 is a view of one of the crank disks. Fig. 5 is a detail view of the guide for the lower joint of the rods.

The numeral 10 indicates the ordinary windmill turntable and upon this are mounted standards 11 of any preferred type which carry bearings 12.

The shaft attached to the windmill, the latter not being necessary to be here shown, is indicated by the numeral 13. Upon the inner end of this shaft is mounted a crank disk 14. This crank disk is provided with a crank having one journal as indicated at 15 projecting from the surface of the disk. A crank arm 16 extends from this journal diagonally across the surface of the disk and carries at its outer end a second journal 17. The journals 15 and 17 are equidistant from the axis of the shaft 13 forming the center of the crank disk. Further the angle formed by the lines drawn from the centers of these journals through the center of the crank disk is a right angle so that the journals 15 and 17 are quartered on the disk. Upon the ground there is a supporting frame 18 provided with bearings 19 wherein is carried a shaft 20 and mounted on the end of this shaft is a crank disk 21 having a journal 22 projecting therefrom whereon is mounted a crank arm 23 carrying at its outer end a second journal 24 similar in all respects to the crank disk 14 and its crank arrangement.

Passing through the center of rotation of the turntable 10 is a three part connecting rod which serves to connect the journals or crank pins 17 and 24, these journals being so positioned on the turntable and in the frame 18 that they permit the connecting rod to lie in the position indicated. This three part connecting rod consists of the rods 25, 40 and 41 respectively. The approximate ends of the rods 25 and 40 are each provided with a groove 26, and a sleeve 27 is slipped over these sections, and this sleeve carries a pair of set screws 28 the points of which enter the grooves 26. Thus it will be seen that while the sleeve is held from longitudinal movement the parts are freely rotatable one on the other. The windmill may thus turn around in any direction without affecting the operation of the connecting rod. The other end of the rod 40 is connected to a hinge joint 38 which is carried by the rod 41, the other end of said rod 41 being connected as above noted to a crank pin 24.

On the journal 15 is mounted an upper connecting rod section 29, and on the journal 22 is mounted a lower connecting rod section 30. Now it is obvious that if a similar arrangement to that used in connecting the joints of the rods 25 and 40 were adopted to connect the rods 29 and 30, the latter would be twisted around the rod 25 upon rotation of the windmill. To provide against this, the lower end of the rod section 29 is flattened as at 31, and is secured to a hollow sleeve 32 through which the rod 40 passes, the rod being freely reciprocable with reference to the sleeve 32. Since the rods 29 and 25 will assume varying angles with relation to each other as the crank disks rotate, the sleeve 32 is made of sufficient size to permit lateral movement of the rod 25 therein. On the lower end of the sleeve 32 there is provided an annular ring 33 having, preferably in its upper surface, an annular groove 34. The upper end of the rod 42 is provided with a pair of jaws, the lower one of which is indicated at 35 and the upper one at 36. The upper jaw 36 carries a set screw 37, the point of which extends into the groove 34 when the parts are assembled. By means of this arrangement the sleeve 32 may rotate freely with reference to the rod 42 so that the rod 29 may revolve about the rod 25 as a center without affecting the relationship of the rod 42 to the rod 25. In order to accommodate the varying angular positions of the upper and lower rods, the rod 42 is connected to the rod 30 by means of a hinge joint as indicated at 38.

Suitable guides 39 are mounted on the lower frame-work for guiding the said joints 38. It will be observed that the respective rods each have a stroke of equal length, this being due to the fact that the cranks 15 and 17 are equi-distant from the axis of the shaft 13.

There has thus been provided a simple and efficient device of the character described and for the purpose specified, the arrangement being such as to prevent the windmill from being on dead centers at any point, while at the same time allowing for free rotation of the windmill around one of the rods.

It is obvious that minor changes may be made in the form and proportions of the parts without departing from the material principles involved, and it is not, therefore, deemed necessary to confine the invention to the exact form herein shown and described but it is wished to include all such as properly come within the scope of the appended claim.

Having thus described the invention, what is claimed as new, is:—

In a device of the kind described, a lower horizontal shaft, fixed bearings for said shaft, an upper horizontal shaft, a turn table, means supporting said turn table, bearings mounted on said turn table and carrying said upper shaft, a double crank on each of said shafts, a rod having its upper end connected to one of the upper cranks, a sleeve swiveled on the lower end of said rod, a rod swiveled in said sleeve, a rod having its lower end connected to one of the lower cranks, a hinge joint between the second and third rods, a rod connected to the other of said upper cranks, a sleeve fixedly attached to the lower end of said fourth rod and surrounding the second rod in spaced relation thereto, a flange formed around the lower end of said sleeve and provided with a groove extending around its upper face, a rod having an end provided with arms engaging over the upper and lower faces of said flange, a set screw in the last mentioned rod engaging in the groove in said flange, a rod having its lower end connected to the remaining lower crank, and a hinge joint between the last mentioned rods.

In testimony whereof, I affix my signature, in presence of two witnesses.

PAUL HABECK.

Witnesses:
H. L. DeVilliers,
D. L. Walker.

---

Copies of this patent may be obtained for five cents each, by addressing the "Commissioner of Patents, Washington, D. C."